United States Patent

Benim et al.

[11] Patent Number: 6,085,514
[45] Date of Patent: Jul. 11, 2000

[54] METHOD OF STEAM COOLING THERMALLY HIGHLY LOADED UNITS OF A GAS-TURBINE GROUP

[75] Inventors: Ali Cemal Benim, Düsseldorf; Franz Joos, Weilheim/Bannholz, both of Germany

[73] Assignee: ABB Alstom Power (Switzerland) Ltd., Baden, Switzerland

[21] Appl. No.: 08/999,256

[22] Filed: Dec. 29, 1997

[30] Foreign Application Priority Data

Dec. 27, 1996 [DE] Germany .................. 196 54 472

[51] Int. Cl.$^7$ ......................................... F02C 7/12
[52] U.S. Cl. ................ 60/39.05; 60/39.55; 60/39.182
[58] Field of Search ....................... 60/39.55, 39.05, 60/39.182, 39.58

[56] References Cited

U.S. PATENT DOCUMENTS

| | | | |
|---|---|---|---|
| 2,636,345 | 4/1953 | Zoller | 60/39.55 |
| 2,770,097 | 11/1956 | Walker | 60/39.55 |
| 3,335,565 | 8/1967 | Aguet | 60/39.05 |
| 3,657,884 | 4/1972 | Hugoson | 60/39.55 |
| 3,747,336 | 7/1973 | Dibelius et al. | 60/39.55 |
| 4,041,699 | 8/1977 | Schelp | 60/39.55 |
| 4,550,562 | 11/1985 | Rice | 60/39.182 |
| 4,571,935 | 2/1986 | Rice | 60/39.02 |
| 4,823,546 | 4/1989 | Cheng | 60/39.55 |
| 4,893,467 | 1/1990 | Woodson | 60/39.55 |
| 5,170,622 | 12/1992 | Cheng | 60/39.55 |
| 5,329,758 | 7/1994 | Urbach et al. | 60/39.55 |
| 5,461,854 | 10/1995 | Griffin, Jr. | 60/39.55 |
| 5,640,840 | 6/1997 | Briesch | 60/39.55 |
| 5,689,948 | 11/1997 | Frutschi | 60/39.55 |
| 5,826,422 | 10/1998 | Koyama et al. | 60/39.55 |

FOREIGN PATENT DOCUMENTS 195 08 018 A1 12/1996 Germany.

*Primary Examiner*—Ted Kim
*Attorney, Agent, or Firm*—Oblon, Spivak, McClelland, Maier & Neustadt, P.C.

[57] ABSTRACT

In a method of cooling the thermally highly stressed units of a gas turbine, a steam quantity (31, 32) which first of all cools a turbine (3, 5) is used, and then the same steam quantity is directed into a combustion chamber (2, 4). After this combustion chamber has been cooled, this steam quantity is introduced into the burn-out zone of the relevant combustion chamber. In this way, the combustion, designed for low NOx emissions, of the relevant combustion chamber is not affected by this introduction of the steam quantity; furthermore, with this introduced steam quantity, the burn-out zone can be moderated for minimizing the remaining pollutant emissions.

8 Claims, 1 Drawing Sheet

METHOD OF STEAM COOLING THERMALLY HIGHLY LOADED UNITS OF A GAS-TURBINE GROUP

BACKGROUND OF THE INVENTION

1. Field of the Invention

The present invention relates according to the preamble of claim 1.

2. Discussion of Background

It is normal practice to use compressed air for cooling thermally highly loaded units of a gas-turbine group, for example a combustion chamber, which compressed air, for this purpose, is branched off intermediately or after compression has been effected. However, it is now the case that, in modern gas turbines, the fuel should be premixed with if possible all the compressor air in order to achieve low-pollution combustion at maximized efficiency. Air losses, as occur in the known air-cooling systems of the thermally highly loaded units, are therefore to be avoided. A further problem in such air-cooling systems consists in the fact that the thermally consumed air in each case has to be fed back into the turbine process at a suitable point, in which case an air quantity, which has cooled the turbine for example, then cannot readily be directed as cooling medium into the combustion chamber, since higher pressures regularly prevail there. Cooling potential is therefore always lost during the feedback of this cooling air into the turbine process and has to be replaced by other media.

This initial situation comes to the fore, for example, if the gas-turbine group is designed for sequential firing.

In the case of gas turbines which are operated in combination with a downstream steam circuit, the practice of using steam, which is available anyway, for the cooling of the thermally highly loaded units has been adopted, based on the fact that the waste heat available from the last gas turbine is able to generate more steam than is necessary to operate the steam turbine belonging to the steam circuit. It has become known to introduce this freely available steam into the gas-turbine process in order to increase the output. In this case, for thermodynamic and fluidic reasons, attention is drawn to the fact that the admixing with the combustion air cannot impair the combustion as such. However, this regularly leads to complicated injection techniques, which not least are connected with the mixture formation of two media which are different in temperature, pressure and behavior. In addition, it must not be left unmentioned that the fuel control is extremely difficult to handle here.

SUMMARY OF THE INVENTION

Accordingly, one object of the invention, as defined in the claims, is to use in a method of the type mentioned at the beginning the freely available steam quantity in a further beneficial manner in such a way that its subsequent admixing to the gas-turbine group at a suitable point is not able to impair the combustion in the combustion chamber.

According to the invention, the cooling of the combustion chamber is to be carried out solely with a steam quantity. Since this steam is freely available for the above reasons, it is not to be carried in the circuit in a conventional manner but is to be admixed at a suitable point, after the cooling purpose has been fulfilled, with the hot-gas flow of the combustion chamber cooled beforehand, whereby, compared with a closed cooling-steam circuit, which is also conceivable per se, the configuration of the cooling elements, inter alla, is greatly simplified, since steam losses can be tolerated to a certain extent in the case of the proposal according to the invention.

The suitable point for the admixing of the steam quantity used beforehand for cooling purposes is interdependent with the envisaged aim of effecting the combustion with minimized pollutant emissions, in particular as far as the NOx emissions are concerned. Due to lean combustion, low NOx emissions can be expected, so that the admixing of the steam quantity used beforehand for cooling purposes is, on the one hand, to be effected separately from this combustion and, on the other hand, is to be effected after complete burn-out has been effected, so that the CO emissions and UHC emissions can thus also be minimized. This suitable point is located in the last third of such a combustion chamber. The proposed steam cooling may of course be used at each combustion chamber; the corrections for an optimum injection are then made here from case to case by determining the point suitable for this purpose as a function of the extension of the burn-out zone of the relevant combustion chamber.

This admixing may be effected here in a homogeneously distributed manner over the periphery, since the steam is already distributed peripherally by the cooling which has been effected. In addition, by a simple design of the injection openings upstream of the turbine, the optimum combustion-chamber outlet profile for admission to it can be produced here.

The cooling can be carried out in parallel flow or counterflow to the hot-gas flow. A combination of the two types is also possible. Furthermore, it is readily possible, for cooling purposes, to allow the steam quantity to flow in the closed flow path through the turbine prior to the cooling of the combustion chamber. This is only possible here because the pressure ratios between turbine and steam quantity allow the steam quantity to be directed in such a way.

Advantageous and expedient further developments of the object according to the invention are defined in the further claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing of a combined gas/steam plant (combined-cycle plant) with a steam quantity directed for the purposes of cooling the thermally loaded or thermally highly loaded units.

All elements not required for directly understanding the invention have been omitted. The direction of flow of the media is designated by arrows.

DESCRIPTION OF THE PREFERRED EMBODIMENTS

Figure 1:
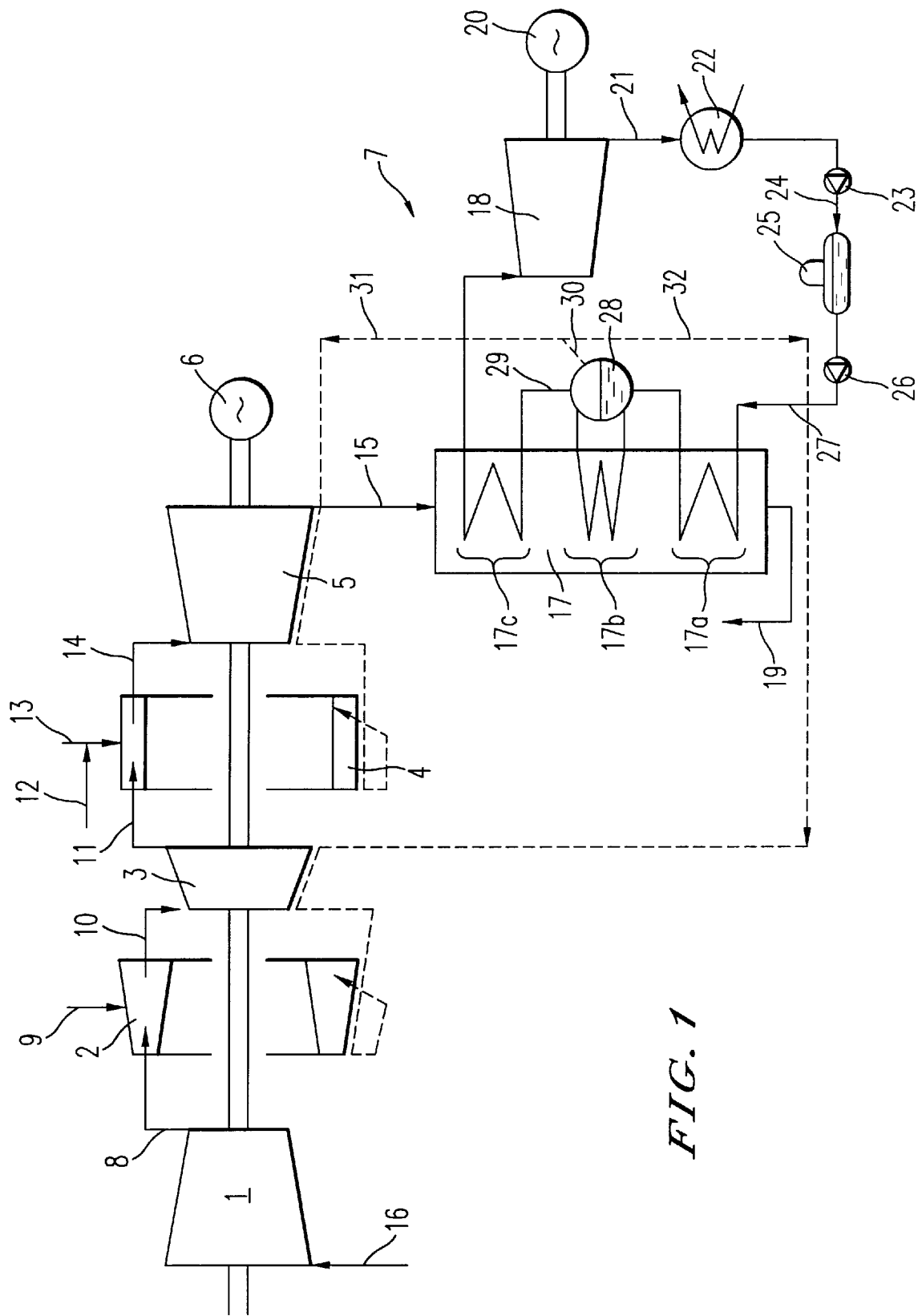

Referring now to the drawing, the FIGURE shows a combined-cycle plant which comprises a gas-turbine group and a downstream steam circuit 7. The gas-turbine group itself comprises a compressor unit 1, a first combustion chamber 2, arranged downstream of the compressor unit 1 and called HP combustion chamber below, an HP turbine 3 acting downstream of this combustion chamber, a second combustion chamber 4, arranged downstream of the HP turbine and called LP combustion chamber below, and an LP turbine 5 acting downstream of this combustion chamber. A generator 6 provides for the generation of electrical energy. The air 16 drawn in by the compressor unit I is directed as compressed air 8 into the HP combustion chamber 2 after compression has been effected. This combustion chamber 2 is fired with a fuel 9, which may actually be gaseous and/or liquid, depending on the type of burner used in this combustion chamber. Combustion chambers are normally operated with a diffusion burner; however, this combustion chamber 2 is preferably to be operated with a premix burner, as is described in EP-B1-0 321 809, this subject matter of the invention being an integral part of this description. The hot gases 10 from the HP combustion chamber 2 are first of all admitted to the HP turbine 3. This turbine 3 is designed in such a way that a minimum expansion takes place here in such a way that its exhaust gases 11 have a relatively high temperature. Located downstream of this turbine 3 is the LP combustion chamber 4, which essentially has the form of an annular cylinder. This combustion chamber 4 does not have a conventional burner configuration: here, the combustion takes place by self-ignition of a fuel 13 injected into the hot exhaust gases 11. Starting from the fact that the fuel here is a gaseous fuel, that is, for example, natural gas, certain indispensable preconditions have to be fulfilled for self-ignition: first of all it can be assumed that self-ignition according to the present configuration does not take place until a temperature of around 1000° C. is reached, and this is also to be the case during part-load operation. However, this requirement may have a significant adverse effect on an optimum thermodynamic design of the gas turbine process. For thermodynamic reasons, therefore, the ratio of the HP turbine 3 must not be increased to such an extent that this results in a low outlet temperature of, for example, about 500° C., as would be advantageous for reliable operation of a downstream conventional combustion chamber. In order to ensure certain self-ignition in the LP combustion chamber 4 even under inadequate conditions, the gaseous fuel 13 injected into the LP combustion chamber 4 may be mixed with a quantity of another fuel 12 which has a low ignition temperature. Oil is especially suitable here as an auxiliary fuel for a gaseous base fuel. This liquid auxiliary fuel 12, appropriately injected, functions as an igniting fuse, so to speak, and permits self-ignition in the LP combustion chamber 4 even if the exhaust gases 11 from the HP turbine 3 have a temperature which is below the optimum self-ignition temperature. The hot gases 14 prepared in the LP combustion chamber 4 are then admitted to the LP turbine 5. The calorific potential of the exhaust gases 15 from this LP turbine 5 may be further utilized, for example by connecting a steam circuit 7 downstream, for preparing a steam quantity for operating a steam turbine and/or for preheating the injection water.

In particular in such a configuration, the thermal loading on the combustion chambers and on the turbines is quite high, for which reason the cooling must also be extremely efficient. In this case, it must also be taken into account at the same time that gas-turbine groups of this high-output stage cannot generally release much air for cooling purposes if the efficiency and the specific output are not to decrease significantly. However, the thermally loaded units may advantageously be cooled by steam, which is in any case available in sufficient quantity and quality-in the steam circuit 7 connected downstream here. If such a steam circuit is not present, the steam quantity required for this purpose can easily be provided with the aid of a branched-off partial quantity of the waste heat from the last turbine.

The exhaust gases 15 of high calorific value flow through a waste-heat steam generator 17 in which steam is generated by heat-exchange process and forms the working medium for a downstream steam turbine 18 coupled to a generator 20. The exhaust gases, which are then thermally utilized, flow as flue gases 19 preferably via a cleaning plant (not shown) into the open. Further utilization of these flue gases for other purposes is also possible. It is of course also possible to provide reheating in interaction with the waste-heat steam generator 17. The expanded steam 21 from the said steam turbine 18 is condensed in a water or air-cooled condenser 22. The condensate 24 is delivered into a feed-water tank and deaerator 25 by a feed pump 23 arranged downstream of the condenser 22. The sprayed condensate 24 can be brought to boiling state and deaerated by extracting a certain quantity of bleed steam from the steam turbine 18. A further downstream feed pump 26 then pumps the water 27 through the waste-heat steam generator 17. The water 27 first passes through an LP steam generator 17a, and then this steam flows into a boiler drum 28. In the closed circuit, the boiler drum 28 is connected to an IP steam generator 17b in such a way that saturated steam 29 is produced therein and is then fed through an HP steam generator 17c, in which the qualitative steam preparation for admission to the steam turbine 18 takes place.

To cool the units of the gas-turbine group, an excess steam quantity 30 is extracted from the boiler drum 28. The control elements then allow the requisite steam quantity to be directed to the individual units. Two cooling-steam lanes 31, 32 can be seen in the FIGURE. First of all the HP turbine 3 is cooled with the steam quantity 32 in a closed flow path, i.e. without admixing; then the combustion chamber 2 is cooled with this steam quantity in parallel flow or counterflow to the hot-gas flow. After cooling is complete, the steam quantity is then admixed with the hot-gas flow at a suitable point, preferably within the last third of this combustion chamber. A maximized increase in the output of the plant can thus be achieved without influencing the combustion, which is designed for minimized NOx emissions. Furthermore, the injection takes place thermodynamically and fluidically at an optimum point, and an important reduction in the CO emissions and UHC emissions remaining from the burn-out zone is also achieved with this measure. The other steam quantity 31 is used for the same cooling purposes, in a manner analogous to the cooling path described above, for the LP combustion chamber 4 and the LP turbine 5. The extraction of the cooling-steam quantity required here is not restricted to the boiler drum 28.

The units 2, 3, 4, 5 to be cooled, in contrast to the series connections shown in the FIGURE, can also be cooled individually, the admixing of the individual steam quantity with the hot-gas flows then having to be carried out from case to case. In principle, it is also possible here for the steam quantity used for cooling purposes to be admixed individually to the respective combustion chamber, on the outflow side of the burn-out zone. If the thermally highly loaded units of the gas-turbine group are cooled individually, various steam quantities can then be combined before they are introduced into the combustion chambers 2, 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of steam cooling a gas-turbine group, including a compressor unit, at least one combustion chamber having a burn-out zone, at least one turbine and at least one generator, said combustion chamber comprising a combustion zone and a discharge zone, said discharge zone located downstream of said combustion zone, whereby a fuel air mixture flowing through the combustion chamber is ignited and burnt inside said combustion zone, the air being injected exclusively with the fuel, and complete combustion is achieved at a downstream end of the combustion zone, and the combustion is completed when the hot gas resulting from the combustion process enters the discharge zone, the method comprising the steps of:

extracting a quantity of steam from a steam source;

cooling a wall of at least said one combustion chamber solely with said steam; and admixing said steam after cooling of the combustion chamber has been performed, with said hot gas flowing in the combustion chamber in the discharge zone, exclusively downstream from the combustion zone, thus avoiding any affection of the combustion process by said steam.

2. The method of cooling a gas-turbine group with steam as claimed in claim 1, wherein said step of cooling at least said one combustion chamber further comprises the step of:

cooling at least said one turbine with said steam in a closed flow path; and cooling at least said one combustion chamber with said steam in an open flow path.

3. The method of cooling a gas-turbine group with steam as claimed in claim 1, wherein said step of extracting a quantity of steam further comprises the step of:

extracting said steam from a steam circuit connected downstream of said gas-turbine group, wherein downstream is in reference to a steam flow direction through the gas-turbine group.

4. The method of cooling a gas-turbine group with steam as claimed in claim 3, wherein said step of extracting said steam from the steam circuit further comprises the step of:

extracting said steam from a waste-heat steam generator belonging to the steam circuit.

5. The method of cooling a gas-turbine group with steam as claimed in claim 4, wherein said step-of extracting said steam from the waste heat generator further comprises the step of:

extracting said steam from a boiler drum interacting with the waste-heat steam generator.

6. The method of cooling a gas-turbine group with steam as claimed in claim 1, further comprising the step of:

preparing said steam by directing exhaust gas from at least said one turbine into a steam circuit for heating a quantity of water into said steam, wherein said steam source includes said steam circuit.

7. The method of cooling a gas-turbine group with steam as claimed in claim 6, wherein said step of preparing said steam further comprises the step of:

directing exhaust gas from at least said one turbine into a waste heat generator belonging to said steam circuit in order to heat a quantity of water into said steam.

8. The method of cooling a gas-turbine group with steam as claimed in claim 6, wherein said step of preparing said steam further comprises the step of:

directing exhaust gas from at least said one turbine into a boiler drum which interacts with a waste heat generator belonging to said steam circuit in order to heat a quantity of water into said steam.

* * * * *